United States Patent
Dria et al.

(10) Patent No.: US 7,409,858 B2
(45) Date of Patent: Aug. 12, 2008

(54) METHOD FOR MONITORING FLUID PROPERTIES

(75) Inventors: Dennis Edward Dria, Houston, TX (US); Frederick Henry Kreisler Rambow, Houston, TX (US); Moye Wicks, III, Houston, TX (US)

(73) Assignee: Shell Oil Company, Houston, TX (US)

( * ) Notice: Subject to any disclaimer, the term of this patent is extended or adjusted under 35 U.S.C. 154(b) by 65 days.

(21) Appl. No.: 11/561,806

(22) Filed: Nov. 20, 2006

(65) Prior Publication Data

US 2007/0125163 A1 Jun. 7, 2007

Related U.S. Application Data

(60) Provisional application No. 60/738,488, filed on Nov. 21, 2005.

(51) Int. Cl.
*E21B 47/10* (2006.01)
(52) U.S. Cl. .................................. 73/152.33
(58) Field of Classification Search .......... 73/152.02, 73/152.29, 152.33
See application file for complete search history.

(56) References Cited

U.S. PATENT DOCUMENTS

| | | | | |
|---|---|---|---|---|
| 2,720,266 | A | 10/1955 | Broussard et al. | 166/77 |
| 3,363,990 | A | 1/1968 | Blom et al. | 23/230 |
| 3,443,429 | A | 5/1969 | Terwilliger et al. | 73/152 |
| 4,011,756 | A | 3/1977 | Lemos | 73/204 |
| 4,616,705 | A * | 10/1986 | Stegemeier et al. | 166/250.01 |
| 4,654,520 | A | 3/1987 | Griffiths | 250/227 |
| 4,832,121 | A * | 5/1989 | Anderson | 166/250.09 |
| 5,321,257 | A | 6/1994 | Danisch | 250/227.16 |
| 5,400,422 | A | 3/1995 | Askins et al. | 385/37 |
| 5,419,636 | A | 5/1995 | Weiss | 374/161 |
| 5,661,246 | A | 8/1997 | Wanser et al. | 73/800 |
| 5,705,812 | A | 1/1998 | Brewer et al. | 250/264 |
| 5,753,813 | A | 5/1998 | Hagiwara | 73/152.54 |
| 5,798,521 | A | 8/1998 | Froggatt | 250/227.19 |
| 5,804,713 | A | 9/1998 | Kluth | 73/152.01 |
| 5,818,982 | A | 10/1998 | Voss et al. | 385/13 |
| 5,828,003 | A * | 10/1998 | Thomeer et al. | 174/69 |
| 5,954,136 | A | 9/1999 | McHugh et al. | 166/383 |

(Continued)

FOREIGN PATENT DOCUMENTS

DE 19913113 10/2000

(Continued)

OTHER PUBLICATIONS

TH2845—International Search Report—TH2845 PCT—PCT/US2006/044838 dated Mar. 12, 2007.

(Continued)

*Primary Examiner*—Hezron E. Williams
*Assistant Examiner*—John Fitzgerald

(57) ABSTRACT

A method for monitoring fluid properties with a distributed sensor in a wellbore having an inner surface, a top and a bottom comprising causing the distributed sensor to assume a helical shape, pulling the distributed sensor towards the bottom of the wellbore, while retaining the helical shape of the distributed sensor, feeding the distributed sensor into the wellbore so that the distributed sensor is in substantially continuous contact with the inner surface, and allowing the distributed sensor to become at least partially supported by friction at the inner surface.

20 Claims, 6 Drawing Sheets

U.S. PATENT DOCUMENTS

| | | | | |
|---|---|---|---|---|
| 6,009,216 | A * | 12/1999 | Pruett et al. | 385/12 |
| RE36,833 | E | 8/2000 | Moore et al. | 174/47 |
| 6,116,578 | A | 9/2000 | Pruett | 254/134.4 |
| 6,148,925 | A | 11/2000 | Moore | 166/383 |
| 6,233,374 | B1 | 5/2001 | Ogle et al. | 385/13 |
| 6,252,656 | B1 | 6/2001 | Wu et al. | 356/73.1 |
| 6,256,090 | B1 | 7/2001 | Chen et al. | 356/73.1 |
| 6,346,702 | B1 | 2/2002 | Davis et al. | 250/227.14 |
| 6,354,147 | B1 | 3/2002 | Gysling et al. | 73/61.79 |
| 6,363,089 | B1 | 3/2002 | Fernald et al. | 372/20 |
| 6,426,496 | B1 | 7/2002 | Froggatt et al. | 250/227.18 |
| 6,450,037 | B1 | 9/2002 | McGuinn et al. | 73/705 |
| 6,497,279 | B1 * | 12/2002 | Williams et al. | 166/250.01 |
| 6,545,760 | B1 | 4/2003 | Froggatt et al. | 356/477 |
| 6,557,249 | B1 | 5/2003 | Pruett et al. | 29/825 |
| 6,561,488 | B1 | 5/2003 | Walker | 254/134.4 |
| 6,566,648 | B1 | 5/2003 | Froggatt | 250/227.14 |
| 6,612,992 | B1 | 9/2003 | Hossack et al. | 600/467 |
| 6,705,158 | B1 | 3/2004 | Louden | 73/170.12 |
| 6,782,150 | B2 | 8/2004 | Davis et al. | 385/12 |
| 6,854,327 | B2 | 2/2005 | Rambow et al. | 73/250 |
| 6,856,400 | B1 | 2/2005 | Froggatt | 356/477 |
| 6,997,256 | B2 * | 2/2006 | Williams et al. | 166/250.03 |
| 7,240,730 | B2 * | 7/2007 | Williams et al. | 166/250.03 |
| 2003/0079878 | A1 | 5/2003 | Pramann, II et al. | 166/278 |
| 2004/0006429 | A1 | 1/2004 | Brown | 702/12 |
| 2004/0025374 | A1 | 2/2004 | Basso | 36/10 |
| 2004/0084180 | A1 | 5/2004 | Shah et al. | 166/250.16 |
| 2004/0096614 | A1 | 5/2004 | Quigley et al. | 428/36.3 |
| 2004/0173350 | A1 | 9/2004 | Wetzel et al. | 166/253.1 |
| 2005/0034873 | A1 | 2/2005 | Coon et al. | 166/380 |
| 2005/0269093 | A1 * | 12/2005 | Sandberg et al. | 166/302 |
| 2005/0269106 | A1 * | 12/2005 | Wilson et al. | 166/381 |
| 2005/0285059 | A1 | 12/2005 | Gerber et al. | 250/559 |
| 2006/0045408 | A1 | 3/2006 | Jones et al. | 385/12 |
| 2006/0214098 | A1 * | 9/2006 | Ramos | 250/256 |

FOREIGN PATENT DOCUMENTS

| | | |
|---|---|---|
| EP | 124882 | 11/1984 |
| EP | 0892244 B1 | 4/2003 |
| EP | 1672344 A1 | 6/2006 |
| GB | 1570511 | 7/1980 |
| GB | 2405038 A | 2/2005 |
| GB | 2408329 | 5/2005 |
| GB | 2408391 | 5/2005 |
| WO | 2006/003208 | 1/2006 |
| WO | WO2006003208 A1 | 1/2006 |
| WO | WO2006113327 A1 | 10/2006 |

OTHER PUBLICATIONS

TH2845—Written Opinion of the International Search Authority—PCT/US2006/044838 dated Mar. 22, 2007.

James J. Smolen & Alex van der Spek, Distributed Temperature Sensing, pp. i-iv, Chapters 1-7, Appendix A, Appendix B, Appendix C and Appendix D, and List of References.

David S. Czaplak and Scott C. Rashleigh, "Microbend Fiber-Optic Phase Shifter", Journal of Lightwave Technology, vol. LT-4, No. 1, Jan. 1986.

Betty L. Anderson, "New Approach to Microbending Fiber Optic Sensors: Varying the Spatial Frequency", Optical Engineering, Jan. 1995, vol. 34, No. 1.

D. S. Starodubov, et al., "Ultrastrong Fiber Gratings and Their Applications", D-Star Technologies, Inc., pp. 178-185.

Weichong Du, et al., "Long-Period Fiber Grating Bending Sensors in Laminated Composite Structures", SPIE vol. 3330, pp. 284-292.

Seungin Baek, "Characteristics of Short-Period Blazed Fiber Bragg Gratings for Use as Macro-Bending Sensors", Applied Optics, vol. 41, No. 4, pp. 631-636.

* cited by examiner

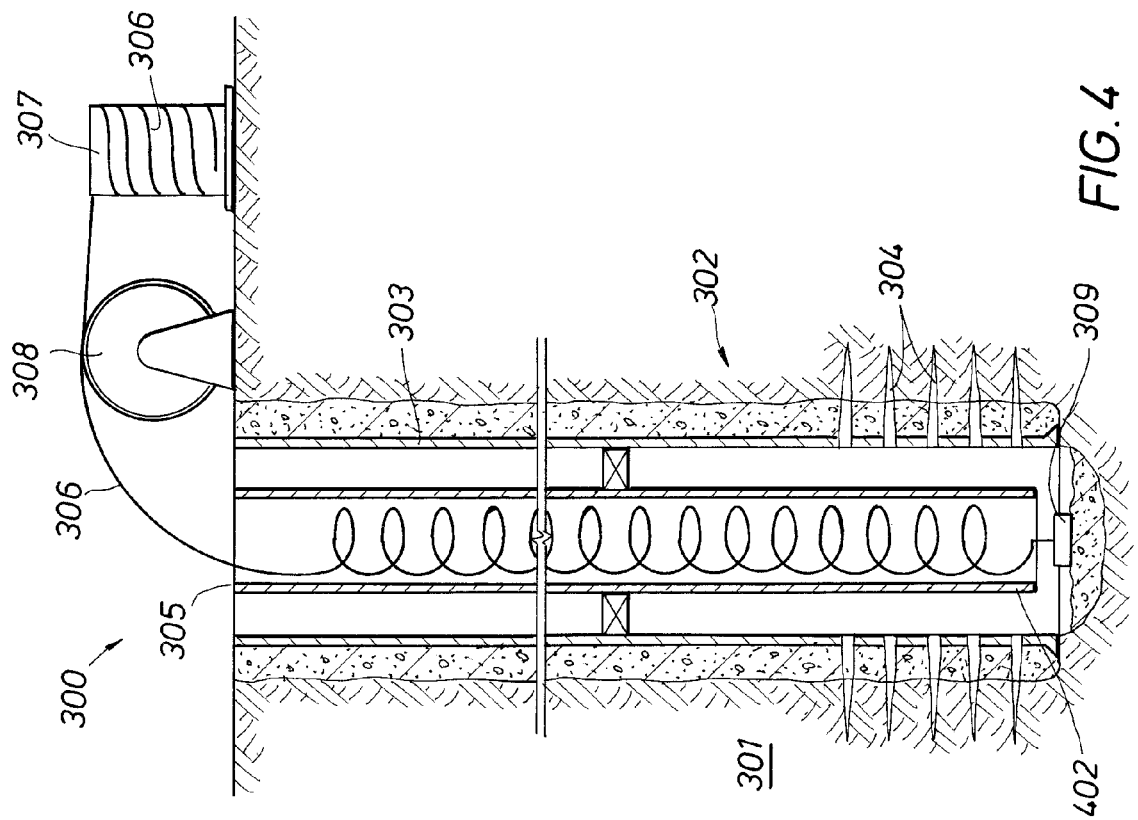
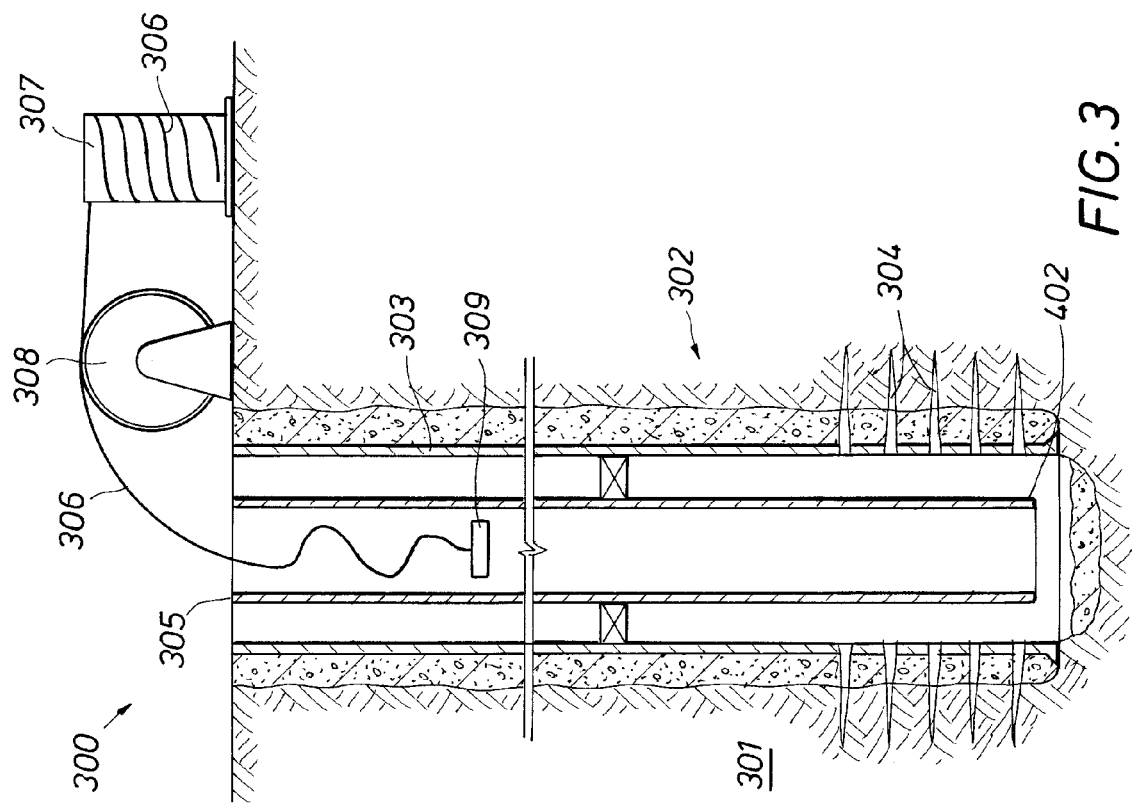

METHOD FOR MONITORING FLUID PROPERTIES

CROSS-REFERENCE TO RELATED APPLICATIONS

This application claims the benefit of U.S. Provisional Application No. 60/738,488, filed Nov. 21, 2005 which is incorporated herein by reference.

FIELD OF INVENTION

The present invention relates to a method for monitoring fluid properties with a distributed sensor in a wellbore.

BACKGROUND

In the oil and gas industry, there is considerable value in the ability to monitor the flow properties of fluid in a well. Many wells consist of several hydrocarbon-producing zones that vary in permeability and are perforated or otherwise left open to permit production. It is desirable to obtain flow data from each of these zones to make operational decisions regarding production rate, stimulation, remediation, and other issues that arise in well operation. In addition to production flow data, injection flow data is also valuable as it can reveal how much fluid is being injected into a particular zone of and how this fluid is being absorbed by the formation.

To address this need, the industry has developed an array of "intelligent well" technologies that are designed to measure flow properties in a producing well. Frequently measured properties include but are not limited to temperature, pressure, composition, and flow rate. Some measurement tools are installed in the well permanently for long term monitoring while others are run into the well during an intervention to obtain a temporary measurement. Despite advances in these intelligent well technologies, the tools currently available are limited by technical challenges. Some challenges include building a sensing device that is durable enough to withstand the harsh conditions of the downhole environment, providing power to such a device, increasing reliability of downhole sensing systems, and developing a tool that measures the properties of the flow in the wellbore without interfering with the production. Although numerous downhole gauges for measuring temperature, pressure, and other properties have been developed, discrete measurements at several points in the well only reveal limited details about the flow conditions downhole. Ideally, an operator would like to obtain a real time continuous profile of the flow properties along the length and circumference of the wellbore as well as radially into the formation.

A promising new development in the area of downhole sensing is distributed temperature sensing or DTS. See James J. Smolen and Alex van der Spek, *Distributed Temperature Sensing: A DTS Primer for Oil & Gas Production*, Shell International Exploration and Production B.V. (May 2003). A DTS system works by utilizing a distributed sensor as the sensing mechanism. Once the distributed sensor is installed in the well, a pulse of laser light is sent along the fiber so that it collides with the lattice structure and atoms of the fiber causing them to emit small bursts of light, which are "backscattered" or returned to the beginning of the fiber. These bursts of light are returned at slightly shifted frequencies. Because of this frequency shift, the backscattered light provides information, which can be used to determine the temperature at the point from which the backscatter originated. Because the velocity of light is constant, one can determine the distance from the surface to the point where the temperature was recorded using the elapsed travel time of the light pulse. By continually monitoring backscattered light, one can obtain a continuous profile of temperature along the length of the fiber.

US Patent Application US 2005/0034873 A1 (hereafter Coon) discloses a method for placing a fiber optic sensor line in a wellbore. The method in Coon includes providing a tubular in the wellbore, the tubular having a first conduit operatively attached thereto, whereby the first conduit extends substantially the entire length of the tubular. The method further includes aligning the first conduit with a second conduit operatively attached to a downhole component and forming a hydraulic connection between the first conduit and the second conduit thereby completing a passageway for the fiber optic sensor line to be urged through with a fluid pump and a hose. Although this method can provide flow data along the entire length of the well, the measurements are limited to a single side of the wellbore. Ideally, operators would like to obtain a complete profile of the inflow and outflow of the well along its depth and circumference.

U.S. Pat. No. 5,804,713 (hereafter Kluth) discloses an apparatus for installation of fiber optic sensors in wells. Kluth discloses an apparatus with a first channel containing at least one sensor location arrangement so that at least one sensor can be pumped through the first channel to the sensor location arrangement with at least one turn such that the physical disposition of the sensor after it has been pumped to the sensor location arrangement is not linear, and the turn comprises a loop of hydraulic conduit. Essentially, the sensor is installed by pumping the line through a hydraulic conduit, which is wrapped around the production tubing. Some parts of the conduit allow the fiber optics cable to be wrapped circumferentially around the pipe while others provide a linear configuration. Generally, a low viscosity fluid must be maintained at a particular flow rate in order to locate the fiber at a specific sensor location. In some applications, a load is applied to the fiber optic line, which could cause potential damage to its sensing capabilities.

U.S. Pat. No. 6,959,604 (hereinafter Bryant) discloses an apparatus for measuring an unsteady pressure within a pipe comprising an optical sensor including at least one optical fiber disposed circumferentially around at least a portion of a circumference of the pipe. The optical fiber provides an optical signal indicative of the length of the fiber. An optical instrument determines a signal indicative of the unsteady pressure in response to the optical signal. In this system the fiber is wrapped circumferentially around the outside of the pipe.

SUMMARY OF THE INVENTION

The present inventions include a method for monitoring fluid properties with a distributed sensor in a wellbore having an inner surface, a top and a bottom comprising causing the distributed sensor to assume a helical shape, pulling the distributed sensor towards the bottom of the wellbore, while retaining the helical shape of the distributed sensor, feeding the distributed sensor into the wellbore so that the distributed sensor is in substantially continuous contact with the inner surface, and allowing the distributed sensor to become at least partially supported by friction at the inner surface.

The present inventions include a wellbore with a producing interval comprising a distributed sensor at least partially supported by friction.

The present inventions include a method for producing oil comprising providing a wellbore with a distributed sensor installed in the wellbore such that the distributed sensor is at least partially supported by friction, measuring fluid properties with the distributed sensor, and producing oil from the wellbore.

BRIEF DESCRIPTION OF THE DRAWINGS

The present invention is better understood by reading the following description of non-limitative embodiments with reference to the attached drawings, wherein like parts of each of the figures are identified by the same reference characters, and which are briefly described as follows:

FIG. 3 shows a side view of a distributed sensor being installed in production tubing of a cased hole completion.

FIG. 4 shows a side view of the distributed sensor in the cased hole completion.

DETAILED DESCRIPTION

The present invention relates to a method for monitoring fluid properties with a distributed sensor in a wellbore. In this application, the term "fluid properties" is intended to refer to pressure, temperature, flow rate, density, strain, conductivity, sonic velocity, composition, presence of particles or any other characteristic related to wellbore fluid. The term "distributed sensor" is used to refer to any sensor capable of obtaining distributed measurements. Examples include but are not limited to fiber optics, distributed temperature sensors, and MEMS (micro electromechanical systems).

Figure 1:
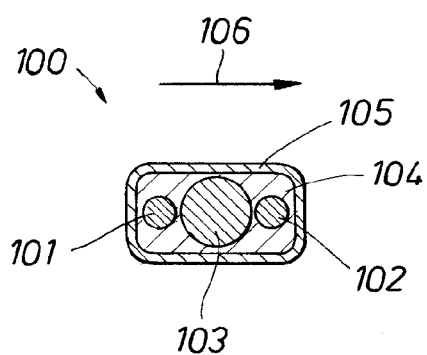
FIG. 1 shows a cross-sectional view of a distributed sensor with a rectangular cross-section.
Figure 2:
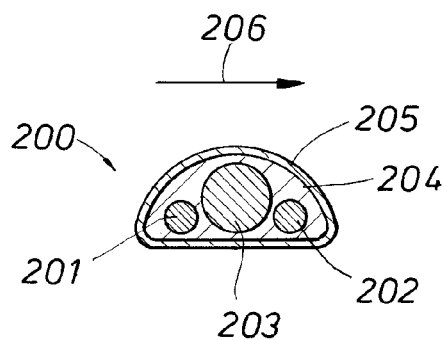
FIG. 2 shows a cross sectional view distributed sensor with a streamlined cross-section.

Turning to the drawings, FIGS. 1 and 2 depict embodiments of the types of distributed sensors that may be used in the present invention. Although these figures depict sensors configured to measure flow rate, the method should not be limited to use with these types of sensor. FIG. 1 shows distributed sensor 100 with a rectangular cross-section; in this case a fiber optic sensor is depicted. Distributed sensor 100 comprises upstream sensor 101 and downstream sensor 102. Heating element 103 is placed between upstream sensor 101 and downstream sensor 102. Upstream sensor 101, downstream sensor 102 and heating element 103 are bundled together in tube 104, which is covered with protective member 105 to isolate the equipment from fluid 106. Item 106 depicts the direction of the fluid flowing across distributed sensor 100.

Distributed sensor 100 works in a manner similar to a hot element anemometer as described in U.S. Pat. No. 6,705,158 B1 and U.S. Pat. No. 4,011,756 which are both hereby incorporated by reference. When fluid 106 flows across distributed sensor 100, the temperature at upstream sensor 101 is slightly cooler than the temperature at downstream sensor 102. By subtracting the temperature at upstream sensor 101 from the temperature at downstream 102, one can determine the temperature rise in proportion to the heat absorbed along distributed sensor 100. From this value, the local flow rate of fluid 106 can be derived.

FIG. 2 shows distributed sensor 200 with a streamlined cross-section. In this drawing, upstream sensor 201 and downstream sensor 202 are shown encased in tube 204 with heating element 203 and intermittently placed. Protective member 205 encases the equipment to shield it from fluid 206. Distributed sensor 200 in FIG. 2 works in substantially the same manner as distributed sensor 100 in FIG. 1 described above.

In addition to the configurations depicted, many other sensor configurations may be used. For example, a tri-core fiber optic distributed sensor could be used. In this case, the sensor could have a triangular shape. In addition, one sensor which measures temperature, one which measures pressure, and one which measures strain could be bundled together in a single tube.

The present invention is intended for use in a variety of downhole environments (e.g. cased hole, open hole, multilateral). FIGS. 3-7 show embodiments of the present invention installed in cased hole completion 300. Turning to FIG. 3, wellbore 302 is shown drilled into formation 301. Wellbore 302 is lined with casing 303 and optionally cemented in place. Fluid communication is established with formation 301 by forming perforations 304 using traditional methods known in the art of well completion. Production tubing 305 is installed in wellbore 302 inside of casing 303.

This embodiment of the present invention utilizes a distributed sensor to monitor the fluid properties the wellbore. In order to provide enough data points to construct a production profile along the length and circumference of the wellbore, a coiled distributed sensor is wrapped around the inside of the wellbore. Installation of the distributed sensor in this coiled manner enables the operator to obtain a circumferential profile along the entire length of the wellbore. In addition, this configuration may increase vertical resolution and minimize drag, thereby enabling the sensor to better withstand the velocity of the flow.

Before installation, distributed sensor 306 is wound around spool 307, causing it to retain a helical shape. After distributed sensor 306 is wound, it is pulled into wellbore 302. The embodiment in FIG. 3 illustrates distributed sensor 306 being pulled into wellbore 302 by attaching weight 309 to the end of distributed sensor 306 and drawing it downwards. Any type of weight or mechanism for pulling distributed sensor 306 into wellbore 302 could be used as an alternative to sinker bar 309.

Sheave assembly 308 is used to feed distributed sensor 306 into wellbore 302. As distributed sensor 306 is being fed into wellbore 302, sheave assembly 308 measures the tension at the top of wellbore 302. Sinker bar 309 is attached to the bottom of distributed sensor 306. Sinker bar 309 is used to pull distributed sensor 306 into wellbore 302, partially straightening it but retaining the spiral cast from spool 307.

After distributed sensor 306 is fully inserted into wellbore 302, sinker bar 309 is lowered below last perforation 304 into bottom of wellbore 302 as shown in FIG. 4. As this is done, the tension at top of wellbore 302 begins to fall and distributed sensor 306 begins to assume a more coiled shape from the bottom of wellbore 401 upward due to the effects of the distributed sensor 306 weight. Distributed sensor 306 begins to coil near bottom of production tubing 402 and increases in radius, reaching the wall of production tubing 305. As more distributed sensor is fed from the top, the coiled portion touching the wall of production tubing 305 begins to increase.

Figure 6:
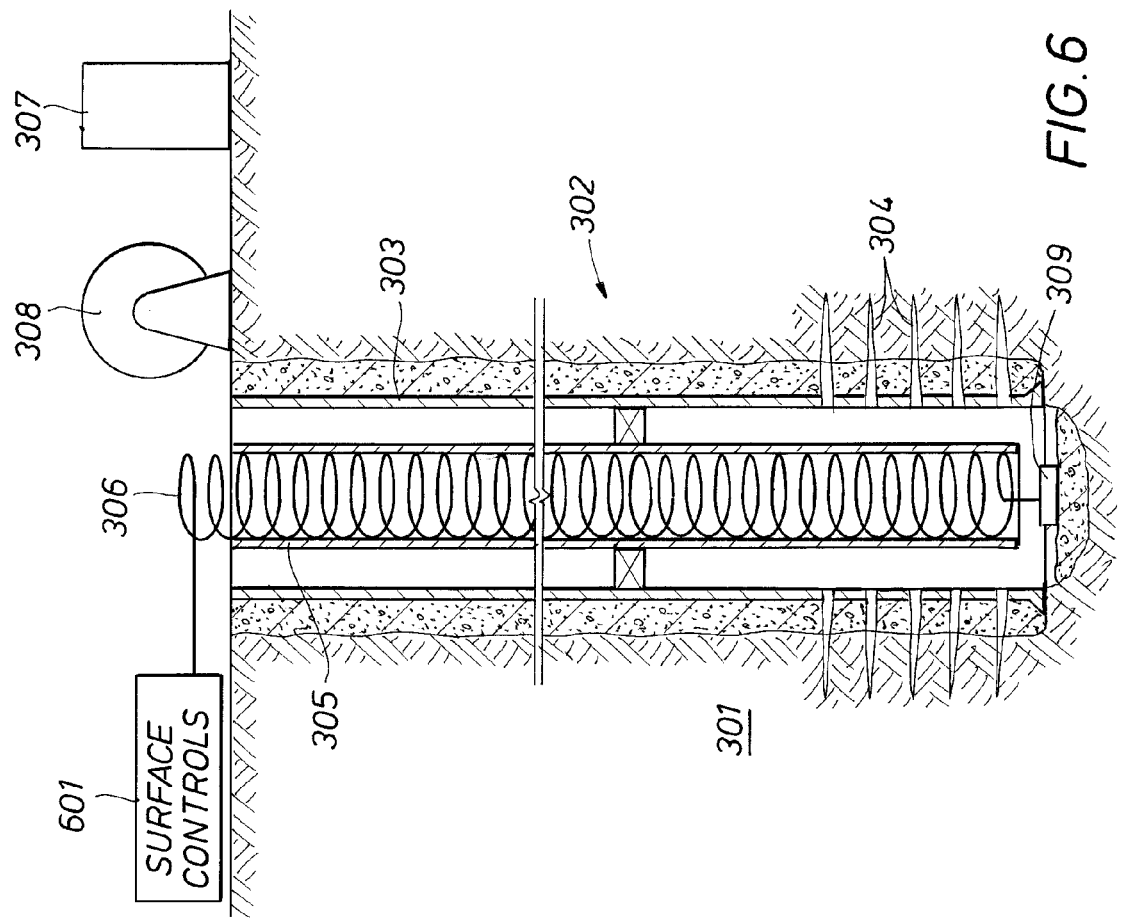
FIG. 6 shows a side view of the distributed sensor installed in the cased hole completion coupled to a surface control system.
Figure 5:
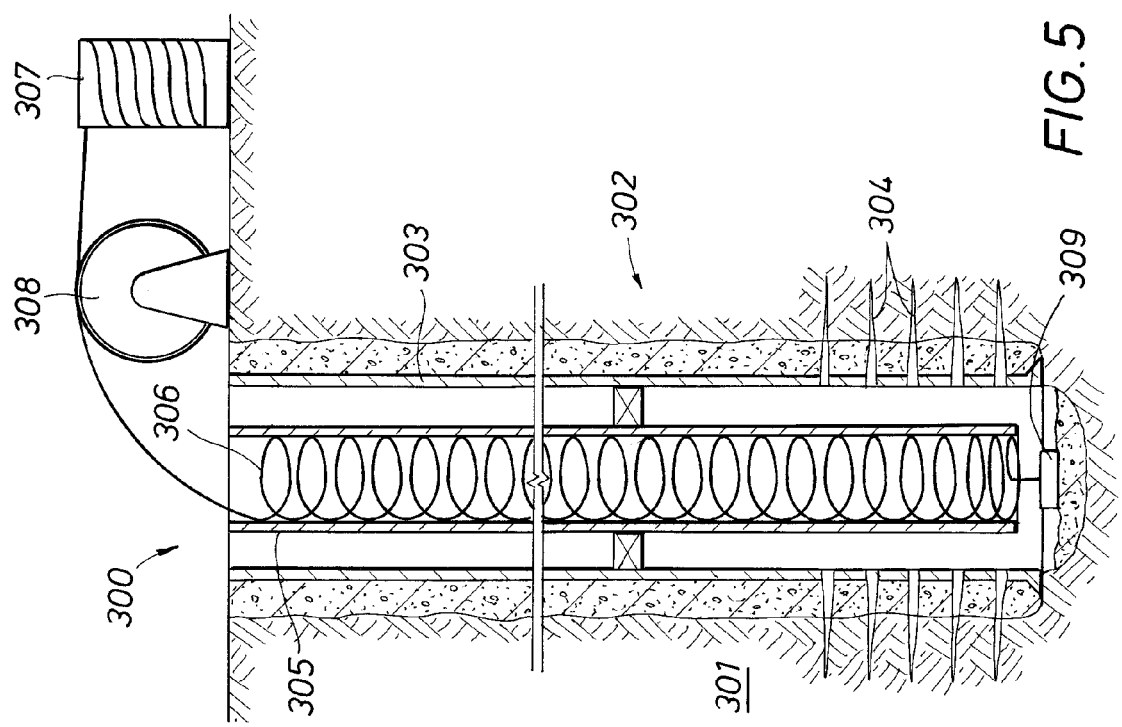
FIG. 5 shows a side view of the distributed sensor installed in the cased hole completion.

As shown in FIG. 5, eventually the tension felt at the top of the wellbore 302 reduces to zero as distributed sensor 306 becomes supported by friction at the wall of production tubing 305. As shown in FIG. 6, more of the distributed sensor 306 is pushed into the wellbore 302 to assure that the coiled distributed sensor 306 reaches the top of the well and that friction will hold it in place as the well begins to flow. Optionally, in the case where the distributed sensor is a fiber optic cable, pressure may be applied to the member containing the fiber. Applying pressure causes the coiled sensor to straighten; however, it is constrained by the wall of production tubing 305. This increases the friction between the sensor and the wall of the production tubing.

To insure that the distributed sensor is the correct length to reach the entire depth of the wellbore and cover the entire circumference, the length of the distributed sensor must be greater than the depth of the wellbore by a factor of $$\sqrt{1+\left(\frac{\pi D}{P}\right)^2}$$

where D is the diameter of the wellbore and P is the diameter of the spool. Ideally after installation, distributed sensor 306 should be a coiled sheath covering substantially the entire length and circumference of wellbore 302.

After distributed sensor 306 is installed, it is then connected to surface controls 601, the well is sealed, and sheave assembly 308 is disconnected. Distributed sensor 306 now provides a mechanism for obtaining a distributed profile of flow around the circumference and length of wellbore 302.

Figure 7:
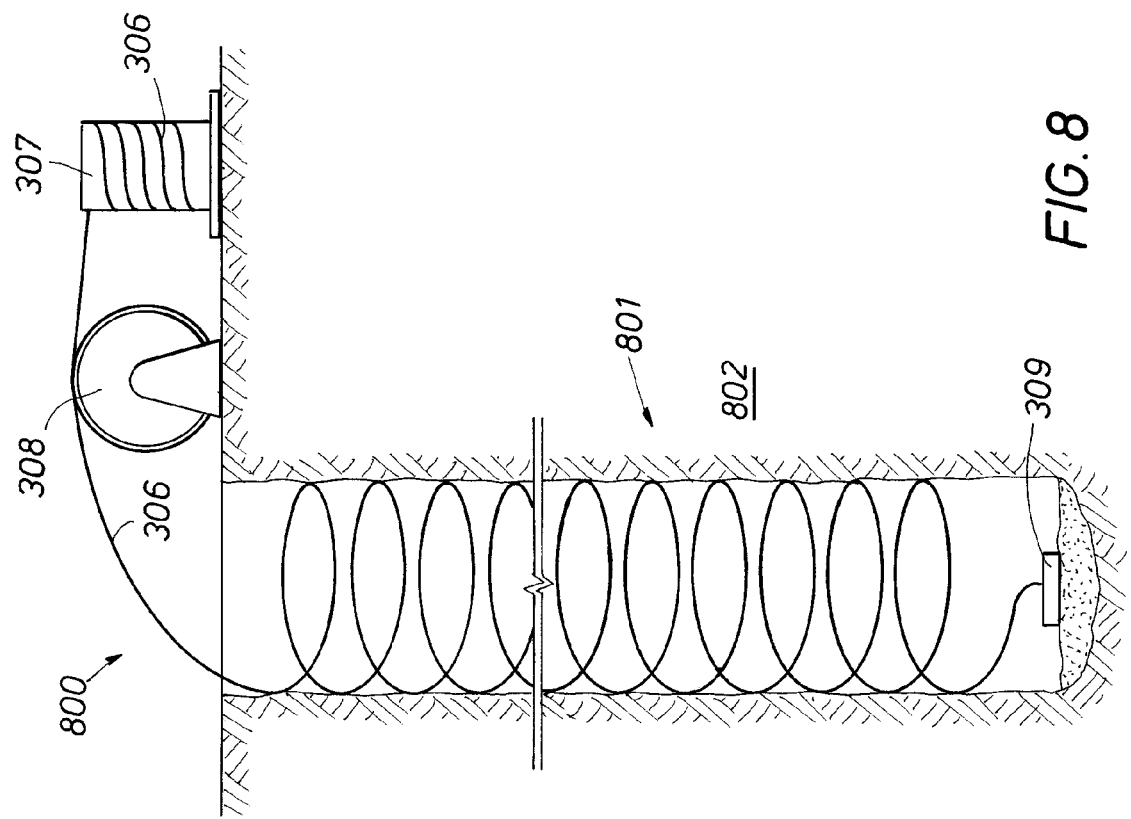
FIG. 7 shows a side view of the distributed sensor deployed in a cased hole completion without production tubing.

FIG. 7 shows an alternative embodiment of the cased hole completion where distributed sensor 306 is pulled into wellbore 302 by sheave assembly 308. In this embodiment, there is no production tubing and the distributed sensor is deployed in casing 303. Here friction between the casing and the distributed sensor holds the distributed sensor in place.

Figure 9:
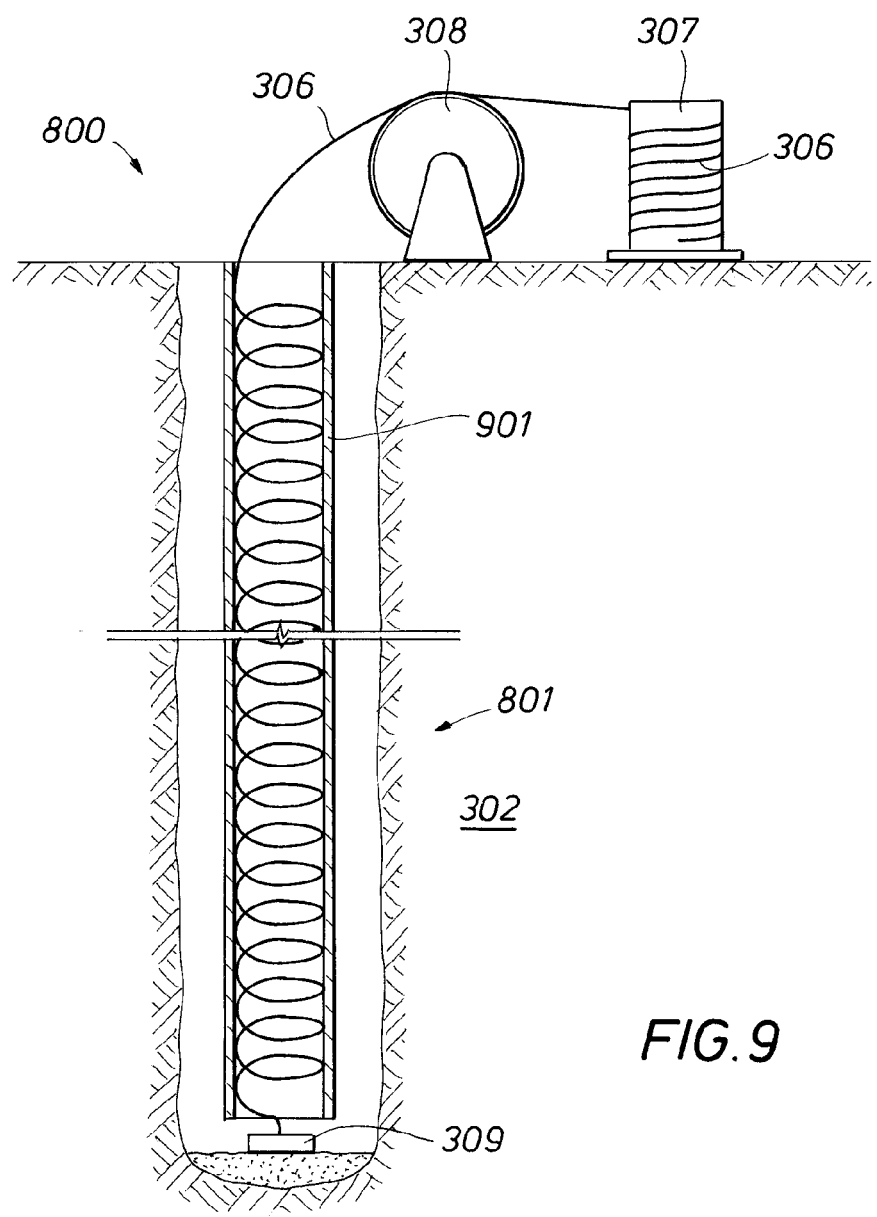
FIG. 9 shows a side view of the distributed sensor deployed in an open hole completion with production tubing.
Figure 8:
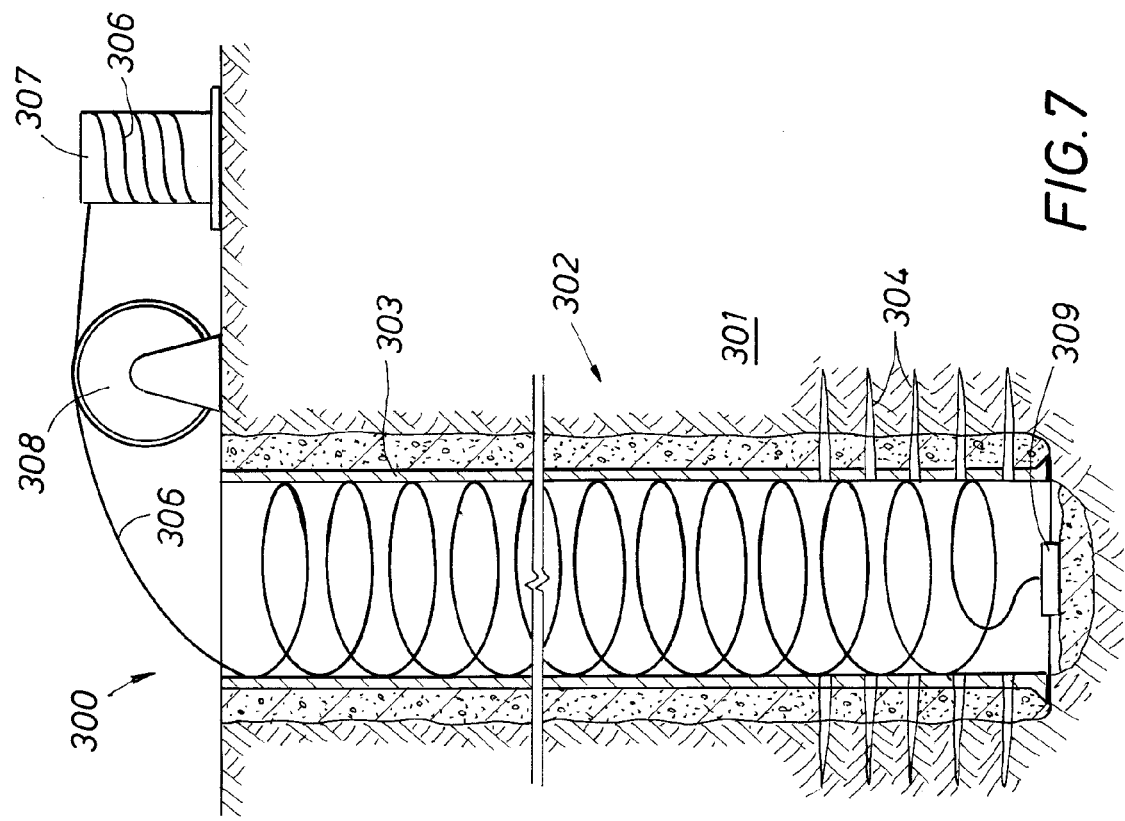
FIG. 8 shows a side view of the distributed sensor deployed in an open hole completion.

FIGS. 8-9 show embodiments of the present invention installed in open hole completion 800. The figures show open hole well 800 consisting of wellbore 801 drilled into formation 802 and left uncased. Optionally production tubing (not shown) can be installed in wellbore 302. If production tubing is installed, the distributed sensor can be deployed in the production as shown in the cased hole embodiments.

Alternatively the distributed sensor can be deployed directly into the wellbore. In these embodiments, distributed sensor 306 is fed into wellbore 801 using spool 307 and sheave assembly 308. Distributed sensor 306 is pulled into wellbore 701 by the weight of sinker bar 309. FIG. 8 shows distributed sensor 306 fully installed in open hole completion 800. As shown, distributed sensor 306 forms a tight coil against formation 802 in wellbore 801. FIG. 9 shows production tubing 901 installed in open hole completion 800. Here distributed sensor 306 forms a tight coil against the inner surface of production tubing 901 in a manner similar to that shown in FIGS. 3-6 depicting the cased hole application. The distributed sensor is supported by friction against the wellbore.

Once the distributed sensor is installed in a cased or open hole completion, the operator can produce oil while monitoring fluid properties in the wellbore. As discussed earlier, an embodiment of the invention is directed at measuring flow properties; one frequently useful flow property if low rate.

Monitoring of flow rate is performed by measuring the temperature of the fluid at the upstream sensor to obtain a first value measuring the temperature of the fluid at the downstream sensor to obtain a second value, subtracting the first value from the second value to obtain a third value corresponding to the temperature rise in proportion to heat absorbed along the distributed sensor; and deriving flow rate from the third value. In this embodiment, if the thermal properties of the distributed sensor, heat input per unit length, and heating element resistivity are known, one can derive flow rate because the measured temperature change will be proportional to the flow rate carrying heat into the fluid. This calculation may be performed using finite element steady state analysis.

Figure 10:
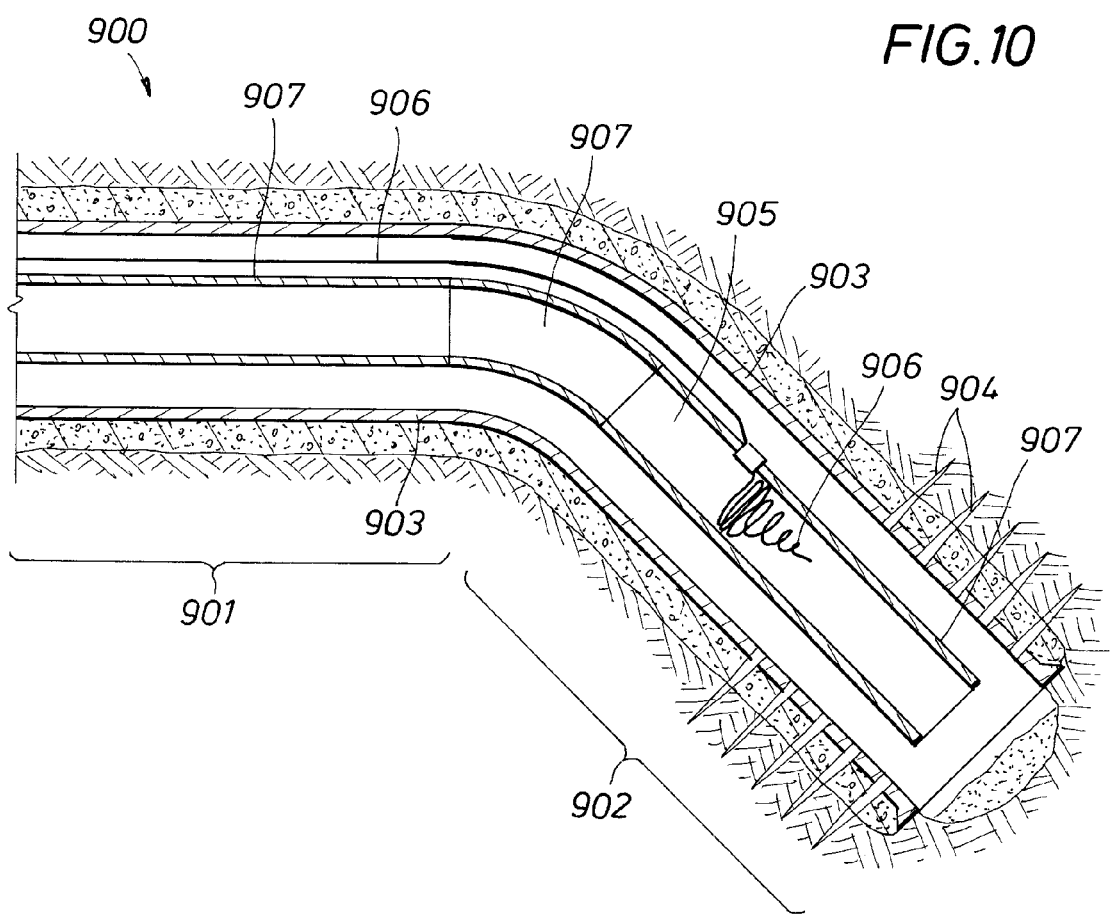
FIG. 10 shows a side view of a distributed sensor deployed across the production interval of a completion.

FIG. 10 shows another embodiment of the invention wherein a distributed sensor is deployed across only the production interval of a completion. This embodiment could be particularly useful in horizontal wells, multilateral wells, or situations in which there are cost or data transmission limitations. In this embodiment, wellbore 900 is divided into horizontal section 901 and vertical section 902. Wellbore 900 is lined with casing 903, which is perforated as shown by drawing element 904. The casing is made up of several joints, one of which is sensor joint 905. Sensor joint 905 contains distributed sensor 906, which is coiled on the inner surface of the joint. In addition to being a joint of casing, sensor joint 905 could also be a sand control screen, a section of liner, or any other downhole component. Joints of traditional tubing 907 are installed in casing 903 along with sensor joint 905, which is placed at a depth corresponding to the production interval of the well. At a specified time, operator may uncoil distributed sensor 906 thereby deploying the sensor over the producing internal.

Figure 11:
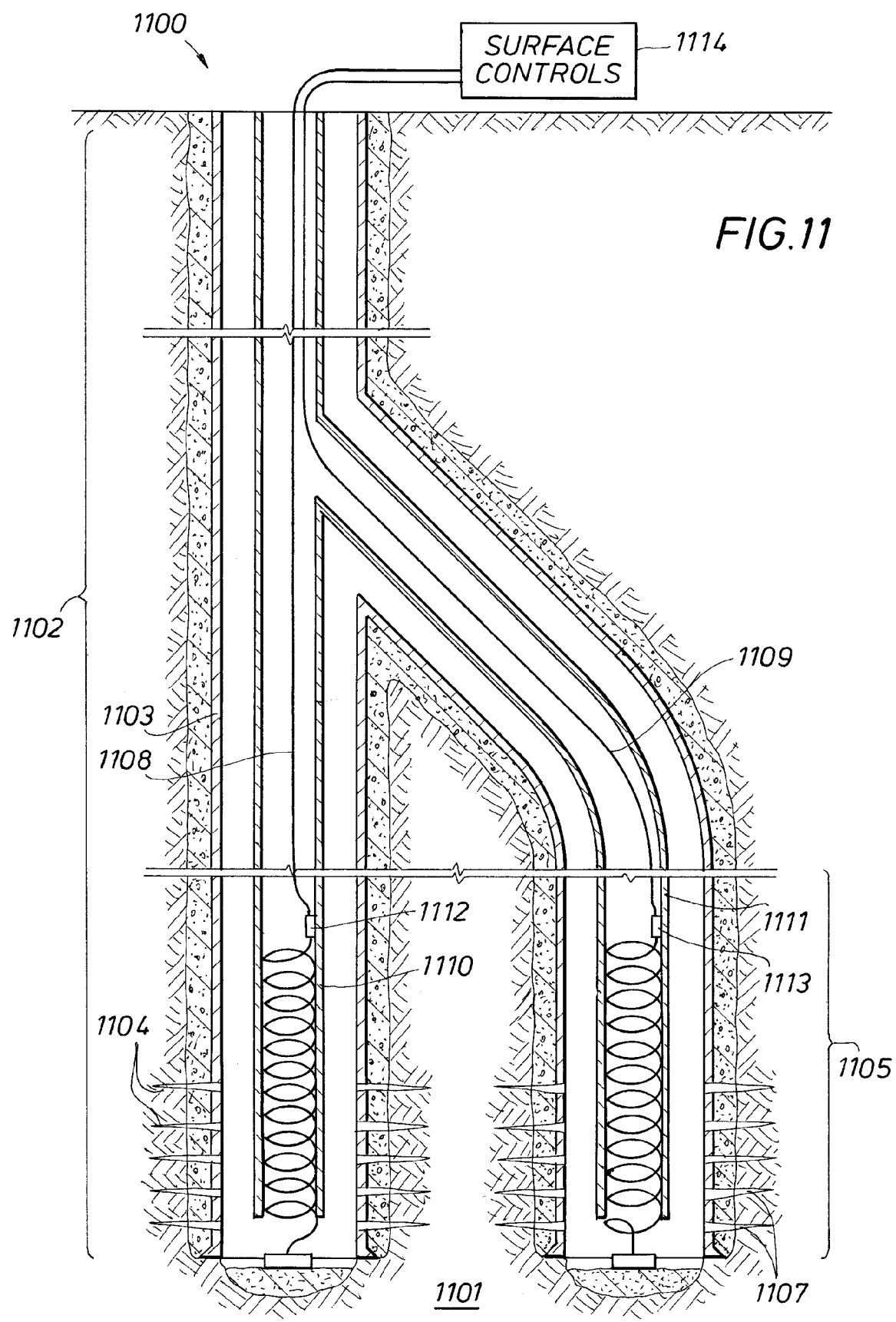
FIG. 11 shows a side view of a multilateral well with the distributed sensor installations across production intervals.

This embodiment may also be adapted for use in multilateral wells as shown in FIG. 11. FIG. 11 shows multilateral well 1100 drilled into formation 1101. Multilateral well 110 consists of leg one 1102 (lined with casing 1103 and perforated at 1104) and leg two 1105 (lined with casing 1106 and perforated at 1107). First distributed sensor 1108 and second distributed sensor 1109 are provided. First tubing 1110 is installed in leg one 1102, and second tubing 1111 is installed in leg two 1105. First distributed sensor 1108 is coiled inside of first tubing 1110, and second distributed sensor 1109 is coiled inside of second tubing 1111. Connectors 1112 and 1113 connect first distributed sensor 1108 and second distributed sensor 1109 to surface control 114. At a specified time, an operator may choose to deploy either first distributed sensor 1108 over the producing interval of leg one 1102 and/or to deploy second distributed sensor 1109 over the producing interval of leg two 1105.

Those of skill in the art will appreciate that many modifications and variations are possible in terms of the disclosed embodiments, configurations, materials, and methods without departing from their spirit and scope. Accordingly, the scope of the claims appended hereafter and their functional equivalents should not be limited by particular embodiments described and illustrated herein, as these are merely exemplary in nature.

What is claim is:

1. A method for monitoring fluid properties in a wellbore having an inner surface, a top and a bottom, the method comprising:
providing a distributed sensor device comprising an upstream sensor, a downstream sensor, and a heating element bundled together in a protective member; causing the distributed sensor to assume a helical shape;

pulling the distributed sensor towards the bottom of the wellbore, while retaining the helical shape of the distributed sensor;

feeding the distributed sensor into the wellbore so that the distributed sensor is in contact with the inner surface; and measuring fluid flow into the well at a plurality of points along the distributed sensor, the flow measuring method at each point comprising:

providing heat to the fluid flow by heating the heater element;

measuring the temperature of the fluid at the upstream sensor to obtain a first value;

measuring the temperature of the fluid at the downstream sensor to obtain a second value;

subtracting the first value from the second value to obtain a third value corresponding to the temperature rise in proportion to heat by the flowing fluid at that point; and deriving a fluid flow rate from the third value.

2. The method of claim 1 further comprising applying pressure to the protective member to push the distributed sensor against the inner surface and increase friction between the distributed sensor and the inner surface.

3. The method of claim 1 wherein the wellbore is an open wellbore, and the inner surface refers to the inner surface of the wellbore.

4. The method of claim 1 wherein the wellbore is an open wellbore in which a tubular element is installed, and the inner surface refers to the inner surface of the tubular element.

5. The method of claim 1 wherein the wellbore is a cased wellbore in which casing is installed in the wellbore, and the inner surface refers to the inner surface of the casing.

6. The method of claim 1 wherein the wellbore is a cased wellbore with tubing installed inside the casing, and the inner surface refers to the inner surface of the tubing.

7. The method of claim 1 wherein the wellbore includes a producing interval and the distributed sensor is deployed across the producing interval of the wellbore.

8. The method of claim 1 wherein the distributed sensor has a rectangular cross-section.

9. The method of claim 1 wherein the distributed sensor has a stream-lined cross-section.

10. The method of claim 1 wherein the distributed sensor has a triangular cross-section.

11. The method according to claim 1, further comprising the step of:

producing hydrocarbons from the wellbore.

12. The method of claim 1 wherein causing the distributed sensor to assume a helical shape comprises wrapping the distributed sensor around a spool.

13. The method of claim 12 further comprising measuring the tension of the distributed sensor at the top of the wellbore.

14. The method of claim 13 wherein pulling the distributed sensor into the wellbore comprises attaching a weight to the end of the distributed sensor.

15. The method of claim 14 wherein feeding the distributed sensor into the wellbore further comprises supplying the distributed sensor with the spool and running the distributed sensor through a sheave assembly.

16. The method of claim 15 further comprising continuing to feed the distributed sensor into the wellbore until the distributed sensor becomes a coiled sheath covering substantially the entire length and circumference of the wellbore.

17. The method of claim 16 wherein the length of the distributed sensor is greater than the depth of the wellbore by the factor $$\sqrt{1 + \left(\frac{\pi D}{P}\right)^2}$$

where D is the diameter of the wellbore and P is the diameter of the spool.

18. The method of claim 17 further comprising connecting the distributed sensor to a surface control system.

19. The method of claim 18 further comprising monitoring fluid properties with the distributed sensor.

20. The method of claim 19 wherein the distributed sensor is selected from the group consisting of fiber optic sensors, distributed temperature sensor, distributed pressure sensors, and micro electromechanical sensors.

* * * * *